(12) United States Patent
Shimizu

(10) Patent No.: US 7,268,806 B2
(45) Date of Patent: Sep. 11, 2007

(54) EXPOSURE CONTROL DEVICE FOR CAMERA MOUNTED ON ELECTRONIC APPARATUS

(75) Inventor: Shuji Shimizu, Kanagawa (JP)

(73) Assignee: Sony Corporation (JP)

( * ) Notice: Subject to any disclaimer, the term of this patent is extended or adjusted under 35 U.S.C. 154(b) by 643 days.

(21) Appl. No.: 09/891,267

(22) Filed: Jun. 27, 2001

(65) Prior Publication Data

US 2002/0021901 A1    Feb. 21, 2002

(30) Foreign Application Priority Data

Jun. 28, 2000    (JP) .......................... P2000-194863

(51) Int. Cl.
 *H04N 5/235* (2006.01)
(52) U.S. Cl. .................... 348/221.1; 348/362; 348/373
(58) Field of Classification Search ................ 348/262, 348/366, 209.12, 221.1, 14.04, 14.06, 207.1, 348/208.12, 208.16, 211.12, 211.14, 296, 348/362, 370, 375, 376, 373
See application file for complete search history.

(56) References Cited

U.S. PATENT DOCUMENTS

| | | | | |
|---|---|---|---|---|
| 5,353,058 A | * | 10/1994 | Takei | 348/363 |
| 5,550,754 A | * | 8/1996 | McNelley et al. | 348/14.01 |
| 5,602,615 A | * | 2/1997 | Muramatsu et al. | 396/228 |
| 5,621,462 A | * | 4/1997 | Takahashi et al. | 348/363 |
| 5,677,733 A | * | 10/1997 | Yoshimura et al. | 348/362 |
| 5,764,291 A | * | 6/1998 | Fullam | 348/362 |
| 5,801,919 A | * | 9/1998 | Griencewic | 361/683 |
| 5,880,783 A | * | 3/1999 | Ma | 348/373 |
| 5,880,928 A | * | 3/1999 | Ma | 361/683 |
| 6,137,525 A | * | 10/2000 | Lee et al. | 348/14.02 |
| 6,473,631 B1 | * | 10/2002 | Siddoway et al. | 455/575.1 |
| 6,587,151 B1 | * | 7/2003 | Cipolla et al. | 348/373 |
| 6,904,298 B2 | * | 6/2005 | Arai et al. | 455/556.1 |
| 6,933,981 B1 | * | 8/2005 | Kishida et al. | 348/375 |

FOREIGN PATENT DOCUMENTS

JP    08223492 A  *  8/1996

* cited by examiner

*Primary Examiner*—Ngoc-Yen Vu
*Assistant Examiner*—Chriss S Yoder, III
(74) *Attorney, Agent, or Firm*—Rader Fishman & Grauer PLLC; Ronald P. Kananen

(57) ABSTRACT

An exposure control device accurately adjusts exposure even when photographing the operator. An area-integration circuit divides a photographed image into a central area and a peripheral area to integrate corresponding video signals for the respective areas. When the operator of a notebook personal computer sets the direction of an image pickup unit to photograph himself a control microcomputer multiplies the respective areas by weights so that the weight of the central area is larger than the others, and then it adds the two integration results. The control microcomputer sets the addition result as exposure information, compares the exposure level indicated by the information with a reference level, controls an electronic shutter of an image pickup device and a gain of an amplifier circuit so that the exposure level coincides with the reference level, and adjusts the exposure of a video camera to a proper level. When the image pickup unit is set in the direction opposite to the operator, the conventional exposure control is performed.

13 Claims, 5 Drawing Sheets

EXPOSURE CONTROL DEVICE FOR CAMERA MOUNTED ON ELECTRONIC APPARATUS

BACKGROUND OF THE INVENTION

1. Field of the Invention

The present invention relates to a device for controlling the exposure of an electronic camera mounted on an electronic apparatus, such as a portable information terminal.

2. Description of the Related Art

Among electronic apparatuses called portable information terminals, such as notebook personal computers, PDAs (Personal Digital Assistants), and the like, there are some apparatuses which have video cameras and which can photograph the operator of the electronic apparatus or another subject and display the photographed image on a screen of the electronic apparatus. In this kind of electronic apparatus, an image pickup unit of the video camera is generally attached to an upper portion of a display so as to be rotatable in a plane perpendicular to the screen. By rotating the image pickup unit as necessary, the operator or a subject on the opposite side of the apparatus can be photographed. The electronic apparatus also includes a device for controlling the exposure of the video camera which detects the brightness of a photographed image to obtain automatically a proper exposure.

Under normal photographing conditions, the following situations frequently occur: in outdoor photographing, the sky may appear in an upper portion of an image to be photographed, resulting in backlight photographing; and in indoor photographing, a light on a ceiling may exist in an upper portion of a photographed image, resulting in excessive follow light photographing. To realize proper photographing of a natural subject in such a situation, hitherto, a photographed image is divided into an upper area and a lower area and a detection result regarding the brightness of the lower area is highly reflected compared to than that of the upper area to control an exposure.

An operator may train the image pickup unit of the video camera on himself to photograph himself indoors. However, in many cases, a window or light may exist above or near the operator in the background, resulting in backlight photographing or excessive follow light photographing. In such a case, when the method for dividing the photographed image into the upper and lower areas to detect brightness is used, the exposure cannot be properly adjusted so the operator is photographed darkly and an unclear image results.

SUMMARY OF THE INVENTION

The present invention is made to solve the above problems. Accordingly, it is an object of the present invention to provide an exposure control device for a camera mounted on an electronic apparatus, which can properly cope with backlight or excessive follow light even in a case where an operator photographs himself.

To accomplish the above object, according to the present invention, there is provided a device for controlling an exposure of an electronic camera, the camera being mounted on an electronic apparatus having a display and the camera being capable of setting a photographing direction to face, at least, the front or rear of a display screen, the device including: an exposure detecting unit for, on the basis of video signals generated by the electronic camera, generating exposure detection information indicative of the average magnitude of the video signals of a photographed image; an exposure adjusting unit for adjusting the exposure of the electronic camera on the basis of the exposure detection information generated by the exposure detecting unit; and a photographing direction detecting unit for, when the photographing direction of the electronic camera is set to face the rear of the screen, outputting a corresponding direction detection signal, wherein the exposure detecting unit logically divides a photographed image according to first and second patterns; in the division by the first pattern, the photographed image is divided into an upper area and a lower area to generate first exposure detection information relatively strongly reflecting the magnitude of the video signal corresponding to the lower area; and in the division by the second pattern, the photographed image is divided into a central area and a peripheral area to generate second exposure detection information relatively strongly reflecting the magnitude of the video signal corresponding to the central area and, when the photographing direction detecting unit outputs the direction detection signal, the exposure adjusting unit adjusts the exposure of the electronic camera on the basis of the first exposure detection information, and when the photographing direction detecting unit does not output a direction detection signal, the exposure of the electronic camera is adjusted on the basis of the second exposure detection information.

According to the present invention, the exposure detecting unit logically divides a photographed image by the first and second patterns. In the division by the first pattern, the unit divides the photographed image into upper and lower areas to generate the first exposure detection information reflecting relatively strongly the magnitude of the video signal corresponding to the lower area. In the division by the second pattern, the unit divides the photographed image into the central and peripheral areas to generate the second exposure detection information reflecting relatively strongly the magnitude of the video signal corresponding to the central area. When the photographing direction detecting unit outputs the detection signal, the exposure adjusting unit adjusts the exposure of the electronic camera on the basis of the first exposure detection information. When the photographing direction detecting unit does not output a detection signal, the exposure adjusting unit adjusts the exposure of the electronic camera on the basis of the second exposure detection information.

Therefore, when the operator of the electronic apparatus photographs himself, even under conditions where a window or light in above or near the operator, or a bright subject in a lower portion of an area to be photographed would ordinarily cause backlight or excessive follow light, the exposure is adjusted on the basis of the second exposure detection information reflecting relatively strongly the central area of the photographed image. Consequently, the operator can be photographed sharply at the proper exposure.

DESCRIPTION OF THE PREFERRED EMBODIMENTS

Embodiments of the present invention will now be described with reference to the drawings.

Figure 1:
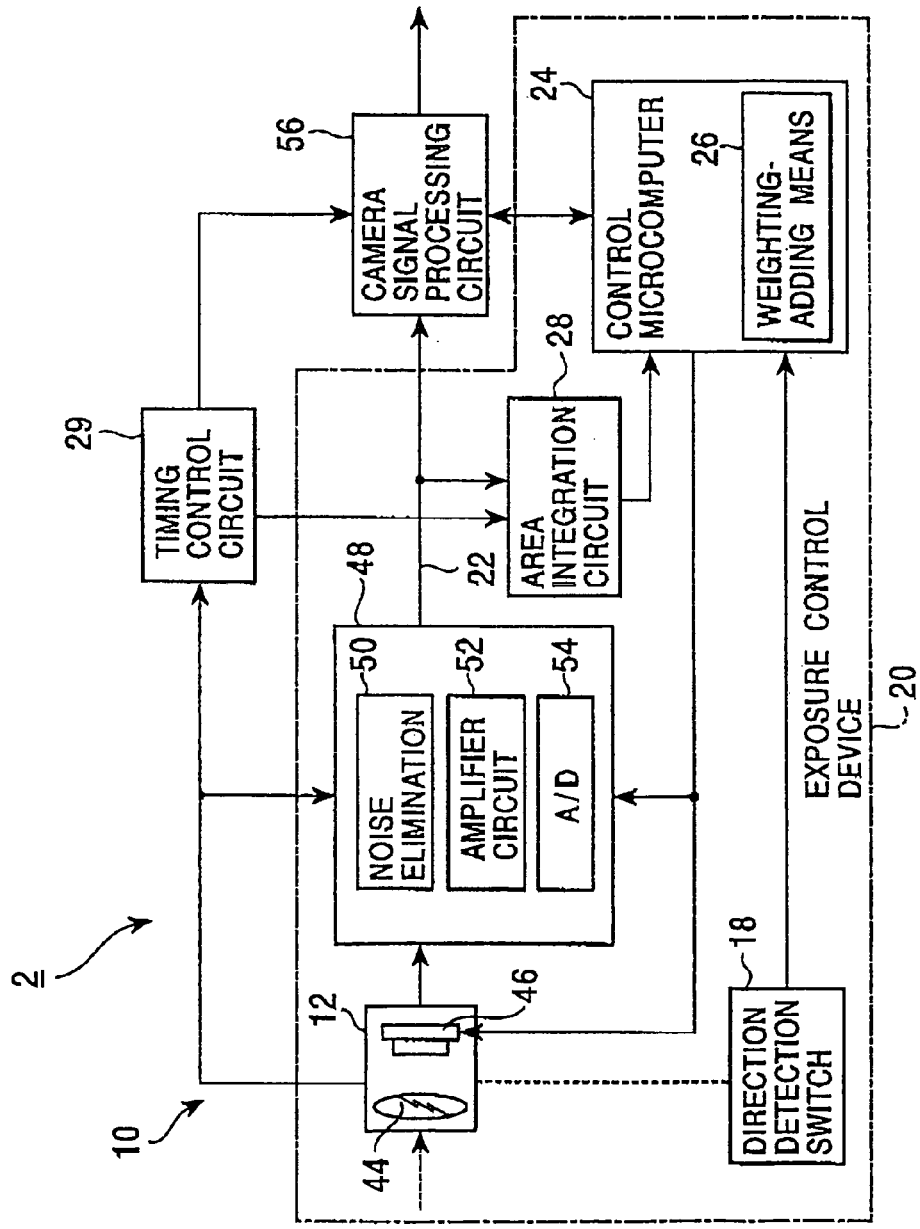
FIG. 1 is a block diagram showing a peripheral portion of a video camera in a notebook personal computer containing one embodiment of an exposure control device for a camera mounted on an electronic apparatus according to the present invention.
Figure 2:
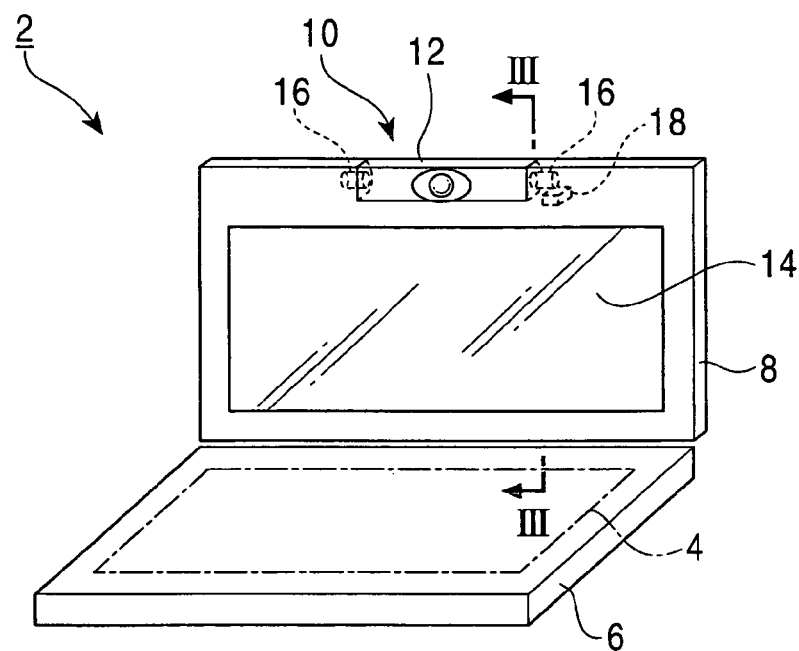
FIG. 2 is a perspective view showing the notebook personal computer containing the exposure control device for the camera mounted on the electronic apparatus according to the embodiment.
Figure 3:
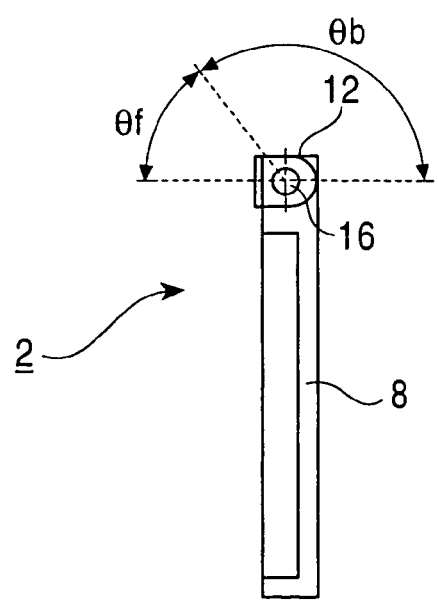
FIG. 3 is a cross-sectional side view taken along a line III-III in FIG. 2.
Figure 4:
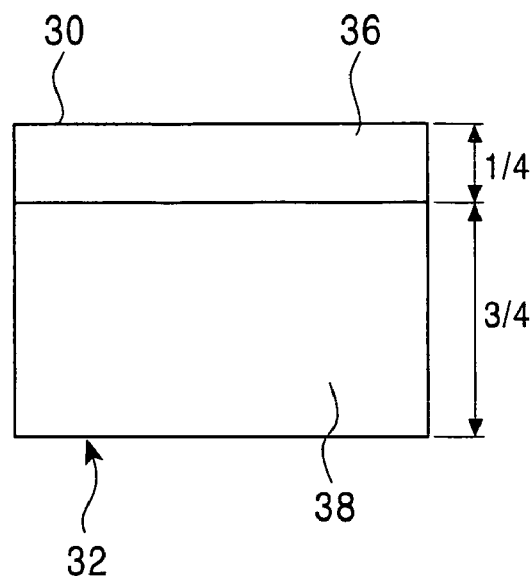
FIG. 4 is an explanatory diagram showing a case where a photographed image is divided by a first pattern.
Figure 5:
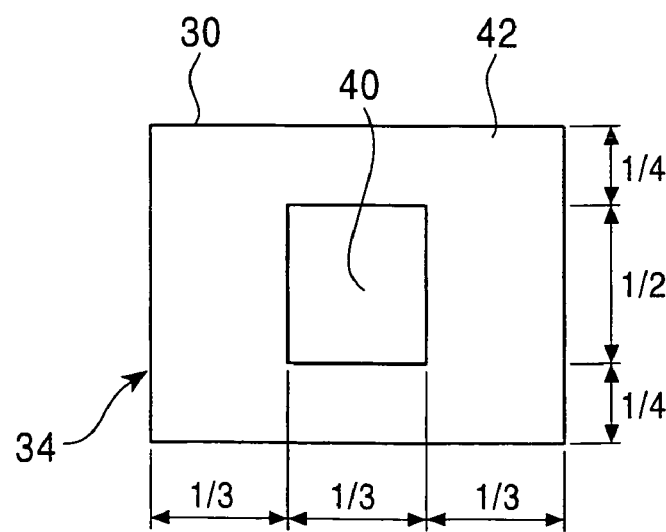
FIG. 5 is an explanatory diagram showing a case where the photographed image is divided by a second pattern.

FIG. 1 is a block diagram showing a peripheral portion of a video camera in a notebook personal computer containing an embodiment of an exposure control device for a camera mounted on an electronic apparatus according to the present invention. FIG. 2 is a perspective view showing the notebook personal computer containing the exposure control device for the camera mounted on the electronic apparatus according to the embodiment. FIG. 3 is a cross-sectional side view taken along a line III-III in FIG. 2. FIG. 4 is an explanatory diagram showing a case where a photographed image is divided by a first pattern. FIG. 5 is an explanatory diagram showing a case where the photographed image is divided by a second pattern.

A notebook personal computer 2 (electronic apparatus) shown in FIGS. 2 and 3 comprises a main body 6, a keyboard 4 formed on the upper surface of the main body 6, and a display 8. The main body and the display are connected pivotably. An image pickup unit 12 of a video camera 10 as an electronic camera is attached at the center of an upper frame of a screen 14 of the display 8. Hinges 16 support both the ends of the image pickup unit 12. The unit 12 is rotatable in a plane perpendicular to and extending vertically from the screen 14. Accordingly, the photographing direction can be set to face the front of the screen 14 (direction of photographing the operator) or the rear of the screen 14.

As shown in FIG. 2, a direction detection switch 18 (photographing direction detecting means) is arranged near the one hinge 16. When the image pickup unit 12 is rotated to set the photographing direction to face substantially the rear of the screen 14, the direction detection switch 18 operates to output a predetermined direction detection signal. More particularly, according to the present embodiment, as shown in FIG. 3, when the image pickup unit 12 is rotated to the rear of the screen 14 so that the photographing direction is set at an angle of about 60 (or more away from the front of the screen 14, the direction detection switch 18 outputs the direction detection signal. Accordingly, when the photographing direction lies in a rotation range of (f (60( ) shown in FIG. 3, the direction detection switch 18 does not output a direction detection signal. When the photographing direction lies in a range of (b, the switch outputs the direction detection signal.

Referring to FIG. 1, an exposure control device 20 according to the embodiment that is built into the notebook personal computer 2 mainly comprises the image pickup unit 12, the direction detection switch 18, an area-integration circuit 28, and a control microcomputer 24.

The control microcomputer 24 functions as a weighting-adding means 26, according to the present invention. As an example, the exposure detecting means according to the present invention comprises the weighting-adding means 26 and the area-integration circuit 28. On the basis of video signals 22 generated by the electronic camera, the exposure detecting means generates exposure detection information indicative of the average amplitude of the video signals 22 of one photographed image.

More specifically, as shown in FIGS. 4 and 5, the exposure detecting means logically divides a photographed image 30 according to first and second patterns 32 and 34. In the division by the first pattern 32, the exposure detecting means divides the photographed image 30 into an upper area 36 and a lower area 38 to generate first exposure detection information reflecting relatively strongly the magnitude of the video signal 22 corresponding to the lower area 38. In the division by the second pattern 34, the means divides the photographed image 30 into a central area 40 and a peripheral area 42 to generate second exposure detection information reflecting relatively strongly the magnitude of the video signal 22 corresponding to the central area 40.

More specifically, the area-integration circuit 28 comprising the exposure detecting means integrates the corresponding video signals 22 for each area obtained by dividing the image according to the first and second patterns 32 and 34 as mentioned above, and outputs a signal indicating the integration result to the control microcomputer 24. The weighting-adding means 26 multiplies the integration results for the respective areas, which are outputted from the area-integration circuit 28, by weights for the areas, and adds respective products to generate first and second exposure detection information.

As an example, the exposure control device 20 includes the control microcomputer 24 and the exposure adjusting means comprising an electronic shutter of the image pickup unit 12 and an amplifier circuit, which will be explained later. The exposure adjusting means adjusts the exposure of the electronic camera on the basis of exposure detection information generated by the weighting-adding means 26.

More particularly, when the direction detection switch 18 outputs the direction detection signal, the exposure adjusting means adjusts the exposure of the electronic camera on the basis of the first exposure detection information. When the direction detection switch 18 does not output a direction detection signal, the exposure adjusting means adjusts the exposure of the electronic camera on the basis of the second exposure detection information.

The image pickup unit 12 of the video camera 10 contains a lens 44 and an image pickup device 46 comprised of a CCD. The image pickup device 46 has an electronic shutter function. The electronic shutter is controlled by a control signal from the control microcomputer 24, so that the exposure of the image pickup unit 12, specifically, the video camera 10, can be adjusted.

A signal from the image pickup device 46 of the image pickup unit 12 is inputted to a signal processing circuit 48 and is subjected to processes by a noise elimination circuit 50, an amplifier circuit 52, and an A/D converting circuit 54, which comprise the signal processing circuit 48, so that the resultant signal is generated as a video signal 22 which is digital. The video signal 22 is inputted to the area-integration circuit 28 and also is inputted to a camera signal processing circuit 56. In the camera signal processing circuit 56, the signal is subjected to a process for inverting the upper and lower portions and the right and left portions of the image under control by the control microcomputer 24.

The amplifier circuit 52 is a variable gain amplifier circuit whose gain is adjusted by the control signal from the control microcomputer 24. By adjusting the gain of the amplifier circuit 52, the amplitude of the video signal 22 varies such that the brightness of the photographed image 30 is changed in accordance therewith. Accordingly, the exposure of the video camera 10 can be adjusted equivalently.

A timing control circuit 29 supplies timing signals, such as vertical synchronization signals and horizontal synchronization signals to the image pickup unit 12, the signal processing circuit 48, the area-integration circuit 28, and the camera signal processing circuit 56. Each unit operates on the basis of the timing signal. Particularly, the area-integration circuit 28 specifies the above-mentioned respective areas on the basis of the respective synchronization signals to integrate the corresponding video signals.

The operation of the exposure control device 20 having such a configuration for the camera mounted on the electronic apparatus now will be described.

When the operator of the notebook personal computer 2 rotates the image pickup unit 12 to photograph a subject other than himself and sets the photographing direction in the range of (b shown in FIG. 3, the direction detection switch 18 operates to output the direction detection signal to the control microcomputer 24.

Signals generated by photographing the subject in this state through the image pickup unit 12 are processed by the signal processing circuit 48 and are then inputted as video signals 22 to the area-integration circuit 28 and camera signal processing circuit 56. In this case, since the direction detection switch 18 outputs the direction detection signal, the control microcomputer 24 instructs the camera signal processing circuit 56 to execute the process, so that the camera signal processing circuit 56 performs the process for inverting the upper and lower portions and the right and left portions of the image to the video signals 22. Consequently, in the image displayed by the video signals outputted from the camera signal processing circuit 56, the inversion caused by turning the image pickup unit 12 upside down due to the rotation is solved, so that the image obtained is in the upright position.

Referring to FIGS. 4 and 5, the area-integration circuit 28 logically divides the photographed image 30 according to the first and second patterns 32 and 34. Further, the circuit 28 integrates the video signals 22 corresponding to the upper area 36 and the lower area 38 of the image divided by the first pattern 32, respectively and also integrates the video signals 22 corresponding to the central area 40 and the peripheral area 42 of the image divided by the second pattern 34, respectively. The image pickup unit 12 scans vertically at intervals of, for example, about 1/30 second. Since the video signals 22 corresponding to the photographed image 30 also are generated at the intervals, the area-integration circuit 28 uses the video signals generated at these intervals to integrate the video signals 22 for each area.

The control microcomputer 24 receives the integration results and operates as a weighting-adding means 26. In this instance, since the direction detection switch 18 outputs the direction detection signal in this case, in a manner similar to the conventional case, the weighting-adding means uses the integration results of the video signals 22 corresponding to the upper area 36 and the video signals 22 corresponding to the lower area 38, multiplies the former result by a relatively small weight, multiplies the latter one by a relatively large weight, and adds both of the obtained products to generate first exposure information.

After that, the control microcomputer 24 compares the exposure level shown by the first exposure information with a reference level and controls the electronic shutter and the gain of the amplifier circuit 52 so that the exposure level shown by the first exposure information coincides with the reference level, thereby adjusting the exposure of the video camera 10 to a proper level.

Subsequently, when the operator of the notebook personal computer 2 rotates the image pickup unit 12 to photograph himself and sets the photographing direction in the range of (f shown in FIG. 3, the direction detection switch 18 does not operate, and a direction detection signal is not generated. Accordingly, the control microcomputer 24 does not instruct the camera signal processing circuit 56 to execute a process. The camera signal processing circuit 56 outputs the video signals 22 from the processing circuit as they are.

On the other hand, the area-integration circuit 28 operates in a manner similar to the above-mentioned case to output the integration results of the video signals 22 for the respective areas. The control microcomputer 24 receives the integration results and operates as weighting-adding means 26. In this case, since the direction detection switch 18 does not output any direction detection signal, the weighting-adding means uses the integration results of the video signals 22 corresponding to the central area 40 and the video signals 22 corresponding to the peripheral area 42, multiplies the former result by a relatively large weight, multiplies the latter one by a relatively small weight, and adds both of the obtained products to generate second exposure information.

Then, the control microcomputer 24 compares the exposure level indicated by the second exposure information with the reference level, and controls the electronic shutter and the gain of the amplifier circuit 52 so that the exposure level denoted by the second exposure information coincides with the reference level such that the exposure of the video camera 10 can be adjusted to the proper level.

According to the present embodiment, when the operator photographs himself in this manner, the integration result of the video signals 22 corresponding to the central area 40 is multiplied by a relatively large weight, as mentioned above. Thus, the second exposure information more strongly reflects the brightness of the central area of the image. Accordingly, when a window or a light may exist near the operator, or when a bright subject may exist in the lower portion of the area to be photographed to cause backlight or excessive follow light in the area, the exposure is adjusted on the basis of the above-mentioned second exposure detection information. Consequently, the operators can clearly photograph himself at the proper exposure.

Notebook personal computers having video cameras have been used in, for example, video conferences. Since the notebook personal computer can obtain clean images at the optimum exposure in any photographing environment with the exposure control device 20 according to the present embodiment, it is more preferably used in video conferences.

Figure 6:
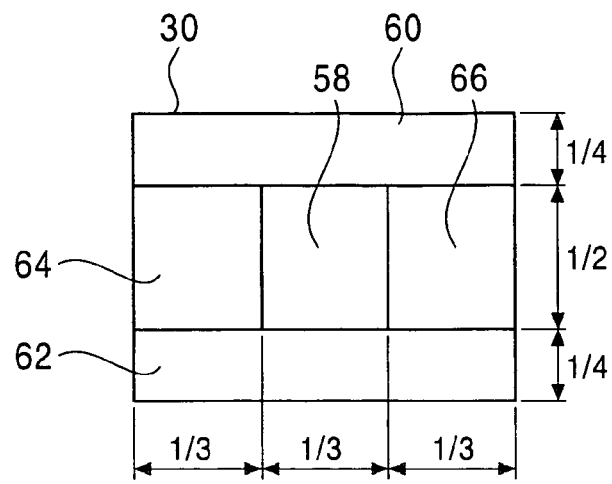
FIG. 6 is an explanatory diagram showing a case where the photographed image is divided by another pattern.

As for the division of the image, in addition to the division into the central area 40 and the peripheral area 42 as shown in FIG. 5, the image also can be divided into five areas, i.e., a central area 58, an upper area 60, a lower area 62, and side areas 64 and 66, as shown in FIG. 6. In this case, the weighting is performed to the areas obtained by dividing the image into smaller portions, respectively. Thus, the exposure can be more effectively controlled. With this type of division, when the operator photographs a normal subject other than himself the same division pattern is used and the weights for the respective areas are changed, so that the exposure can be controlled.

As an electronic camera, in addition to the video camera, a digital still camera also can be used. In this case, when the present invention is applied to the digital still camera, similar advantages can be derived.

Subsequently, a second embodiment of the present invention now will be described.

Figure 7:
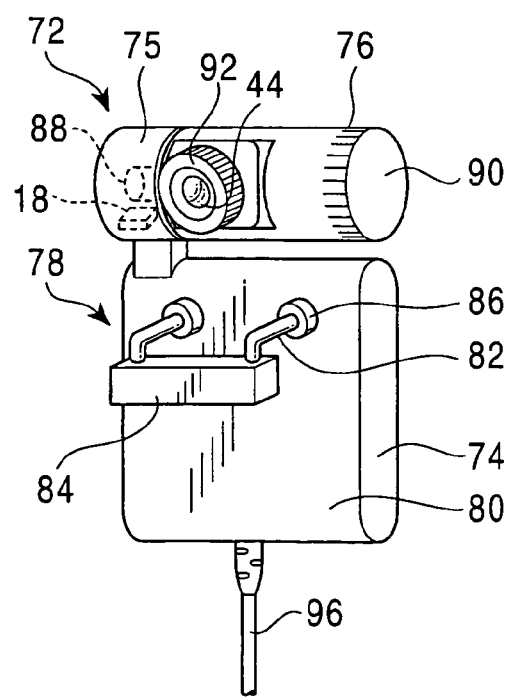
FIG. 7 is a perspective view showing an electronic camera controlled by an exposure control device according to a second embodiment.
Figure 8:
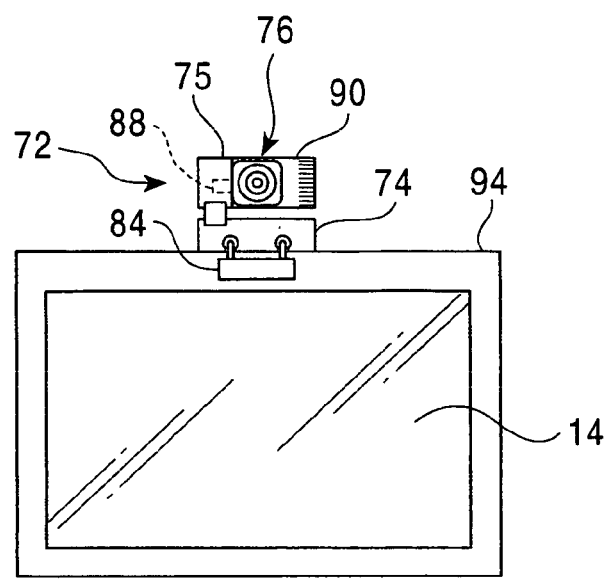
FIG. 8 is a front view showing the electronic camera controlled by the exposure control device according to the second embodiment.
Figure 9:
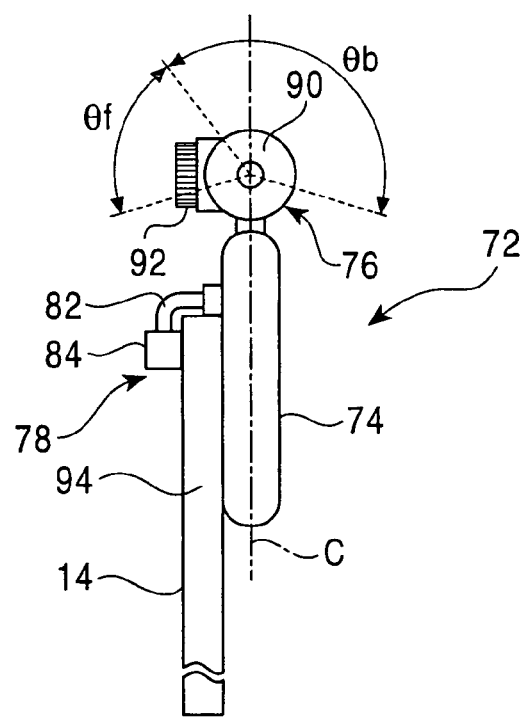
FIG. 9 is a side plan view showing the electronic camera controlled by the exposure control device according to the second embodiment.

FIG. 7 is a perspective view showing an electronic camera controlled by an exposure-control device according to the second embodiment. FIG. 8 shows a front elevation view thereof. FIG. 9 is a side elevation view thereof. In the diagrams, the same components as those in FIGS. 2 and 3 are designated by the same reference numerals.

The second embodiment differs from the foregoing embodiment with respect to the point that a video camera as an electronic camera is detachably provided for a notebook personal computer. Accordingly, the second embodiment will now be described in detail hereinbelow with particular emphasis on this point.

Referring to FIGS. 7 to 9, a video camera 72 comprises a camera main body 74, a camera top part 76 attached onto the camera main body 74, and a hook 78.

The hook 78 includes two arm parts 82, which are provided on a side surface 80 of the camera main body 74, and which protrude therefrom, and a holding part 84. The base of each arm part 82 is slidably supported by each supporting part 86 of the camera main body 74. Each arm part also is inserted into the camera main body 74 and is pulled to the inside of the camera main body 74 by a spring (not shown). The top end of each arm part 82 is bent downward. The holding part 84 is attached to the top ends of the arm parts 82.

The camera top part 76 comprises a fixed part 75 fixed to the camera main body 74 and a rotating part 90 rotatably supported by the fixed part 75 through a hinge 88. The rotating part 90 is rotatable around a logical center line, the logical line being parallel to the direction in which the two arm parts 82 are arranged. According to the present embodiment, the maximum rotation angle is about 210°. An image pickup device comprised of a CCD is built in the rotating part 90. A lens 44 is arranged at the front of the image pickup device. A focus ring part 92 for adjusting the focus is provided for the rotating part 90.

On the other hand, in the fixed part 75 of the camera top part 76, the direction detection switch 18 is arranged close to the hinge 88. When the rotating part 90 of the camera top part 76 is rotated to set the photographing direction to face substantially the rear of the screen 14, the direction detection switch 18 operates to output a predetermined direction detection signal.

According to the present embodiment, as shown in FIG. 9, the rotation range is defined as the area encompassed by rotating the rotating part 90 clockwise and counterclockwise at about 105° with a center line C as reference, the center line C being common to the camera top part 76 and the camera main body 74. Specifically, the direction detection switch 18 operates when the rotation angle of the rotating part 90 lies in the range of θb (from 30° on the front side, namely, on the arm part 82 side, to 105° on the rear side) to output the direction detection signal. On the other hand, when the rotation angle of the rotating part 90 lies in the range of θf (from 30° to 105° on the front side), the switch does not output a direction detection signal.

A circuit board (not shown) is built into the camera main body 74. To form the circuit portion of the exposure control device on the circuit board, circuits corresponding to the signal processing circuit 48, the area-integration circuit 28, the control microcomputer 24, the camera signal processing circuit 56, and the timing control circuit 29 shown in FIG. 1 are mounted on the circuit board. Since the functions and operations of those circuits have already been described in detail, an explanation is omitted here.

When the video camera 72 is attached to the personal computer, the operator pulls the arm parts 82 of the hook 78 away from the camera main body 74 in order to widen the distance between the holding part 84 of the hook 78 and the camera main body 74 while holding the holding part 84 with his fingers, and then he lets go of the part 84 so that the arm parts 82 clamp a frame 94 on the upper side of the screen of the personal computer. Consequently, since the arm parts 82 are pulled as mentioned above, as shown in FIGS. 8 and 9, the frame 94 of the screen 14 is sandwiched between the camera main body 74 and the holding part 84, so that the video camera 72 is fixed to the upper portion of the screen 14.

A photographing result of the video camera 72 is sent from the camera signal processing circuit to the personal computer through, for example, an USB (Universal Serial Bus) cable 96 and is then properly displayed on the screen 14. At that time, when the operator sets the rotation angle of the rotating part 90 in the range of θb, the direction detection switch 18 (FIG. 7) outputs the direction detection signal. Accordingly, similar to the case of the preceding embodiment, a photographed image is divided according to the first pattern 32 (FIG. 4) to generate exposure information. On the basis of the exposure information, the electronic shutter of the image pickup device and amplifier circuit are controlled, so that the exposure of the video camera 72 is adjusted to the optimum level.

When the operator sets the rotation angle of the rotating part 90 in the range of θf, the direction detection switch 18 does not output a direction detection signal. Accordingly, similar to the case of the preceding embodiment, the photographed image is divided according to the second pattern 34 (FIG. 5) to generate exposure information. On the basis of the exposure information, the electronic shutter of the image pickup device and amplifier circuit are controlled, so that the exposure of the video camera 72 is adjusted to the optimum level.

Therefore, when the detachable video camera 72 is used for the personal computer, advantages similar to those of the foregoing embodiment can be derived.

A digital still camera also can be used as such a detachable electronic camera in addition to the video camera. When the present invention is applied to such a case, similar advantages can be obtained.

According to the second embodiment, the video camera 72 is connected to the personal computer through the USB cable. Other interfaces also may be used.

When the detachable electronic camera is used in a manner similar to that of the second embodiment, the electronic apparatus also can be used as long as the electronic camera is not mounted on the electronic apparatus. Thus, the electronic camera can be disposed arbitrarily. Accordingly, even when the rotation angle of the rotating part 90 lies in the range of θf, the subject may not be the operator of the electronic apparatus in some cases. Even when the rotation angle of the rotating part 90 lies in the range of θb, the operator may be a subject in some cases. Accordingly, the following configuration also is useful: a control signal corresponding to the direction detection signal is supplied from the electronic apparatus to the electronic camera in accordance with the operation by the operator, so that the first and second patterns can be alternately selected as a division pattern of the photographed image. Consequently, when the electronic camera is not mounted on the electronic apparatus, the operator selects the division pattern to be used, so that the exposure control can be controlled properly.

When the photographed image 30 is divided into the central area 40 and the peripheral area 42 as shown in FIG. 5, the central area 40 is shaped into a rectangle to reduce the scale of the area-integration circuit, the height thereof is set to, for example, about ½ that of the photographed image 30, and the width thereof is set to, for example, about ⅓ that of the photographed image 30. Consequently, the exposure can be favorably controlled in photographing the operator.

When it is assumed that the weighting value of the whole image is set to 100, the weighting value of the integration result of the video signals 22 for the central area 40 is set to, e.g., 90 and that of the integration result for the peripheral area 42 is set to, e.g., 10. Consequently, a fine image can be obtained as a result.

When the photographed image 30 is divided into the upper area 36 and the lower area 38 as shown in FIG. 4, the upper area 36 is set so as to occupy an upper portion of, e.g., about ¼ that of the photographed image 30. Thus, when a general subject is photographed, the exposure can be controlled satisfactorily.

When it is assumed that the weighting value of the whole image is set to 100, the weighting value of the integration result of the video signals 22 for the upper area 36 is set to, e.g., 10 and that of the integration result for the lower area 38 is set to, e.g., 90. Consequently, a favorable image can be obtained.

Furthermore, when the photographed image 30 is divided into five areas as shown in FIG. 6, the central area 58 is shaped into a rectangle, the height thereof is set to, e.g., about ½ that of the photographed image 30, the width thereof is set to, e.g., about ⅓ that of the photographed image 30, and the height of each of the upper and lower areas 60 and 62 is set to, for example, about ¼ that of the photographed image 30. Thus, the exposure can be controlled satisfactorily when photographing the operator.

In the case where the operator is being photographed, when it is assumed that the weighting value of the whole image is set to 100, the weighting values of the central are a 58, the upper area 60, the lower area 62, the side area 64, and the side area 66 are set to, e.g., 60, 5, 5, 15, and 15, respectively. When a subject other than the operator is photographed, the values are set to, for example, 25, 5, 20, 25, and 25, respectively. Thereby, a fine image can be obtained as a result.

What is claimed is:

1. A device for controlling an exposure of an electronic camera, said camera being mounted on an electronic apparatus having a display screen and the camera being capable of setting a photographing direction to at least a forward direction or a rearward direction relative to the front of said display screen, said device comprising:

exposure detecting means for generating exposure detection information indicative of the average magnitude of video signals of a photographed image based on video signals generated by the electronic camera, exposure adjusting means for adjusting the exposure of the electronic camera based on said exposure detection information generated by said exposure detecting means, first and second camera support means for rotating the electronic camera in a plane perpendicular to and in a plane that vertically extends from the display of the electronic apparatus, photographing direction detecting means for outputting a corresponding direction detection signal when the photographing direction of the electronic camera is set to the rearward direction, wherein said exposure detecting means logically divides one photographed image according to first and second patterns, and in the division by said first pattern, divides said photographed image into an upper area and a lower area to generate first exposure detection information relatively strongly reflecting the magnitude of said video signal corresponding to said lower area, and in the division by said second pattern, divides the photographed image into a central area and a peripheral area to generate second exposure detection information relatively strongly reflecting the magnitude of the video signal corresponding to said central area, wherein said first and second camera support means are respectively located on a first end and a second end of the electronic camera, wherein said photographing direction detecting means is adjacent to said first camera support means, said exposure adjusting means adjusts the exposure of the electronic camera on the basis of said first exposure detection information when said photographing direction detecting means outputs said direction detection signal, wherein said exposure adjusting means adjusts the exposure of the electronic camera on the basis of said second exposure detection information when the photographing direction detecting means does not output a direction detection signal, which occurs when the photographing direction is rotated on said first and second camera support means in a range of θf corresponding to said forward direction, wherein said photographing direction detecting means outputs the direction detection signal only when the photographing direction is rotated on said first and second camera support means in a range of θb corresponding to said rearward direction, and wherein the total range of θf and θb is approximately 180 degrees, and the range of θf is approximately 60 degrees, such that the photographing direction is in the range of θb when it is about 60 degrees or more away from the front of said display screen.

2. The device according to claim 1, wherein said exposure detecting means includes: an area-integration circuit for integrating the corresponding video signals for each area obtained by dividing according to the first and second patterns; and weighting-adding means for multiplying integration results for the respective areas, which are outputted from said area-integration circuit, by weights for the areas, and adding respective products to set addition results as said first and second exposure detection information.

3. The device according to claim 1, wherein the upper area in the division by the first pattern is an upper area about ¼ that of the photographed image.

4. The device according to claim 1, wherein the central area in the division by the second pattern has a substantially rectangular form, the height thereof is about ½ that of the photographed image, and the width thereof is about ⅓ that of the photographed image.

5. The device according to claim 1, wherein the electronic camera includes a solid-state image sensing device as an image pickup device.

6. The device according to claim 5, where said solid-stage image sensing device includes a CCD or a CMOS sensor.

7. The device according to claim 5, wherein said exposure adjusting means controls an electronic shutter of the electronic camera to adjust the exposure.

8. The device according to claim 1, wherein the electronic camera is a video camera or a digital still camera.

9. The device according to claim 1, further comprising a variable gain amplifier circuit which receives the video signal generated by the electronic camera as an input, and wherein said exposure adjusting means controls a gain of said variable gain amplifier circuit to adjust the exposure.

10. The device according to claim 1, wherein the electronic camera is built into the electronic apparatus.

11. The device according to claim 1, wherein the electronic camera is detachable from the electronic apparatus.

12. The device according to claim 1, wherein the electronic apparatus is a portable information terminal.

13. The device according to claim 1, wherein the electronic apparatus is a personal computer or PDA.

* * * * *